United States Patent
Yagasaki

Patent Number: 6,160,889
Date of Patent: Dec. 12, 2000

[54] IMAGE ENCODING METHOD, IMAGE DECODING METHOD AND IMAGE SIGNAL RECORDING MEDIUM

[75] Inventor: Yoichi Yagasaki, Kanagawa, Japan

[73] Assignee: Sony Corporation, Tokyo, Japan

[21] Appl. No.: 08/880,501

[22] Filed: Jun. 23, 1997

[30] Foreign Application Priority Data

Jun. 27, 1996 [JP] Japan ................... 8-167150

[51] Int. Cl.$^7$ ................... H04L 9/00
[52] U.S. Cl. ................... 380/210; 380/212
[58] Field of Search ................... 380/12, 10, 210, 380/212

[56] References Cited

U.S. PATENT DOCUMENTS

| | | | |
|---|---|---|---|
| 5,060,262 | 10/1991 | Bevins, Jr. et al. | 380/19 |
| 5,627,892 | 5/1997 | Kauffman | 380/21 |
| 5,848,154 | 12/1998 | Nishio et al. | 380/4 |

*Primary Examiner*—Todd Swann
*Assistant Examiner*—Todd Jack
*Attorney, Agent, or Firm*—Frommer Lawrence & Haug, LLP.; William S. Frommer; Dexter T. Chang

[57] ABSTRACT

Scrambling is performed without deteriorating the quality of an image encoded by an MPEG method and in which the MPEG standard is used as it is. When a digital image signal formed of a luminance signal and color-difference signals is formed into an encoded signal by an MPEG encoding method, this signal is scrambled by giving a predetermined phase angle to the color-difference signals, the scrambled image signal is MPEG-encoded, a signal for identifying the phase angle is generated, and the at least MPEG-encoded image signal and the signal for identifying the phase angle are multiplexed and output. Thus, scrambling can be performed without changing the MPEG method.

3 Claims, 10 Drawing Sheets

IMAGE ENCODING METHOD, IMAGE DECODING METHOD AND IMAGE SIGNAL RECORDING MEDIUM

BACKGROUND OF THE INVENTION

1. Field of the Invention

The present invention relates to an image encoding method, an image encoding apparatus and an image recording medium. More particularly, the present invention relates to an image encoding method, an image encoding apparatus and an image recording medium used in a system for encoding for storage purposes video signals of a moving image and recording the encoded signals in an image recording medium, such as an optical disk, magnetic disk or magnetic tape, or a system for transmitting video signals of a moving image over a transmission line.

2. Description of the Related Art

When image data is digitally recorded in magneto-optic disks, magnetic tape or the like, or when image data is transmitted via a predetermined transmission medium, the amount of data is reduced by encoding and compressing the data.

Here, a description will be given of a case in which the encoding standard of what is commonly called MPEG (Moving Picture Image Coding Experts Group) is used as an encoding standard.

In encoding by this MPEG method, one video sequence is divided into groups of pictures (GOP), for example, 15-frame units. Each frame is classified into the following three types according to a predictive method:

I picture: (Intra-frame-coded picture), intra-frame-coded picture,

P picture: (Forward-predictive-coded picture), picture of frames for performing movement prediction from past or future P pictures or I pictures, B picture: (Bidirectionally-predictive-coded picture), picture of frames for performing movement prediction from past or future P pictures or I pictures.

In such a compression method of what is commonly called the MPEG method, an image of each frame is predicted in units of macro blocks in any one of the intra-encoding, forward-predictive encoding, backward-predictive encoding, or bidirectionally predictive encoding, and a predictive error is encoded and transmitted. Since, basically, only predictive error is transmitted, it is possible to compress the amount of data to an extent greater than in a case in which image data of each frame is transmitted as it is.

FIGS. 9A and 9B show the relationship between these three types of images; FIG. 9A shows a reference relationship between I pictures and P pictures. In the figures, the image of the lattice pattern represents the I picture, and the image of slant pattern represents the P picture. Further, FIG. 9B shows a reference relationship between the B picture and the I/P pictures. A predetermined number of these pictures form a group of images sequences called a group of pictures.

FIG. 10 shows the structure of each picture. Each picture (frame) is formed of a plurality of units called slices, which are divided horizontally. Further, each slice is formed of a predetermined number of macro blocks. Each macro block is formed of luminance data formed of 4 blocks of 8 pixels×8 pixels, and color-difference data formed of each block of 8 pixels×8 pixels.

Meanwhile, in a pay television system, scrambling is performed to limit the listening and viewing by other than subscribers. This scrambling is based on a system such that an electronic key is given for receiving equipment of a subscriber, a scheme, for example, white and black is reversed at a predetermined cycle, is provided in a blanking period of broadcasting signals, and a normal image is obtained by this key.

Another known scrambling method is such that the phase of a burst is randomly reversed. According to this technology, in a scrambled state, an image becomes extremely poor because color differences change one after another though the shapes can still be distinguished. Further, since there is no deterioration of images due to scrambling, high-quality images can be transmitted in an unscrambled state.

Furthermore, there has been a demand for similar scrambling also in recording media, such as disks. More specifically, since the image quality of a video disk recorded by digital signals does not deteriorate even if copies are made repeatedly, there is a possibility that a large number of illegal copies might be supplied.

Regarding handling of keys for unscrambling, for example, a public key method is known. There are a large number of publications in respect of this public key method in addition to the patent of, for example, U.S. Pat. No. 4,200,770, and therefore, a detailed description thereof has been omitted because the method is a known technology.

Utilization of a scheme such that only an authorized disk can be reproduced by using this public key method is currently being considered.

In the past, when performing scrambling, there has been no appropriate scrambling, in particular, using an MPEG method. For example, the above-described scrambling which reverses the phase of a burst randomly is effective, but this scrambling cannot be immediately implemented because there is no blanking period in the MPEG method.

Accordingly, a scrambling method for the MPEG method having an effect similar to randomly reversing the phase of a burst has been desired.

SUMMARY OF THE INVENTION

In order to solve the above-described problems, in the present invention, in respect of input image signals of an MPEG encoder, a phase angle is given in sequence to the color difference signal thereof, and in this out-of-phase state, the signals are supplied as input image signals to the MPEG encoder. Further, the fact that the phase is shifted, or a signal for identifying a phase angle is written together with encoded data output from the MPEG encoder into, for example, a different area of the same disk in the case of, for example, a disk.

On the decoding side, the signal is unscrambled by obtaining a signal for identification from a reproduction signal, detecting the phase shift of a color-difference signal from this signal, and correcting for the phase shift of the color difference of the decoding signal from the MPEG decoder. The present invention is capable of performing scrambling without changing the existing MPEG method.

The above and further objects, aspects and novel features of the invention will become more apparent from the following detailed description when read in connection with the accompanying drawings.

DESCRIPTION OF THE PREFERRED EMBODIMENTS

Several preferred embodiments of an image encoding method, an image encoding apparatus and an image recording medium in accordance with the present invention will be described below with reference to the accompanying drawings.

As described above, in the MPEG method, a macro block is formed of luminance Y and color differences Cb and Cr, and each macro block is optimized and encoded simultaneously and independently. Therefore, in the present invention, preprocessing is performed on a color-difference signal before being encoded.

Figure 1:
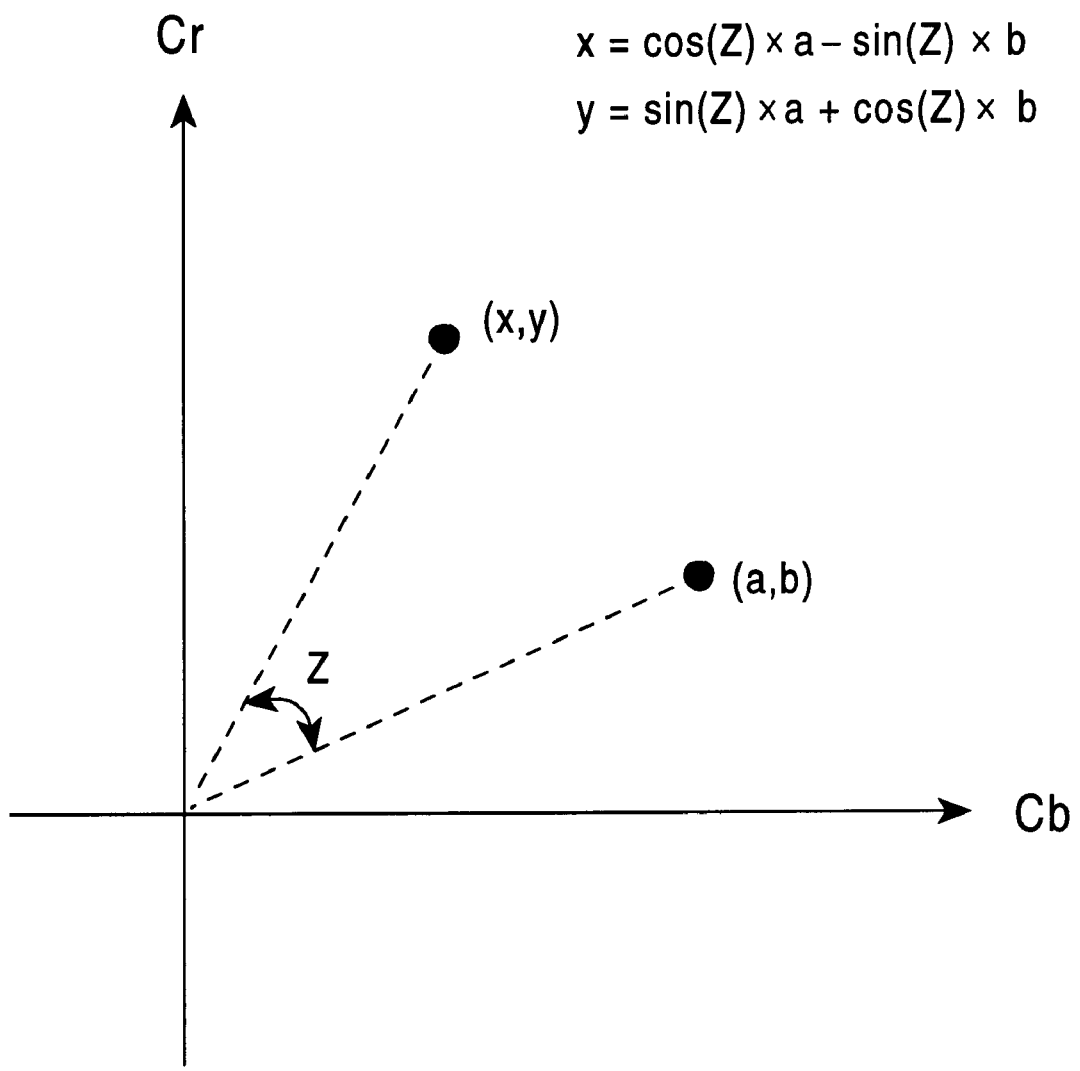
FIG. 1 shows the scrambling principles according to the present invention.

FIG. 1 shows the concept of the present invention.

In FIG. 1, the dotted line and the black circle indicate a carrier color signal and the vector thereof. In the figure, vector (a,b) is represented as a synthesis vector of vector a on the Cb (B-Y) axis and vector b on the Cr (R-Y) axis.

In comparison, vector (x,y) shows a state in which vector (a,b) is rotated through a predetermined angle z. The relation between them is shown in equation (1):

$$x=\cos(z) \times a - \sin(z) \times b \quad y=\sin(z) \times a + \cos(z) \times b \tag{1}$$

As is clear in this figure, when vector (a,b) is formed into vector (x,y) as a result of rotation through a predetermined angle z and this signal is converted into a color-difference signal different from the original color-difference signal and encoded, the color-difference signal is decoded as vector (x,y) on the decoding side if the phase angle is not known. As a result, a color error occurs.

However, if the phase angle z is known also on the decoding side, the original color-difference signal can be obtained if the decoded color-difference signal is subjected to coordinate-axis conversion and formed into vector (a,b).

In the present invention, using this principle, the color-difference signal of the input image signal is coordinate-axis-converted through a predetermined angle. This phase angle z is sequentially changed randomly in GOP units and/or in picture units. The change sequence of this phase angle z is encoded into a key.

Figure 2:
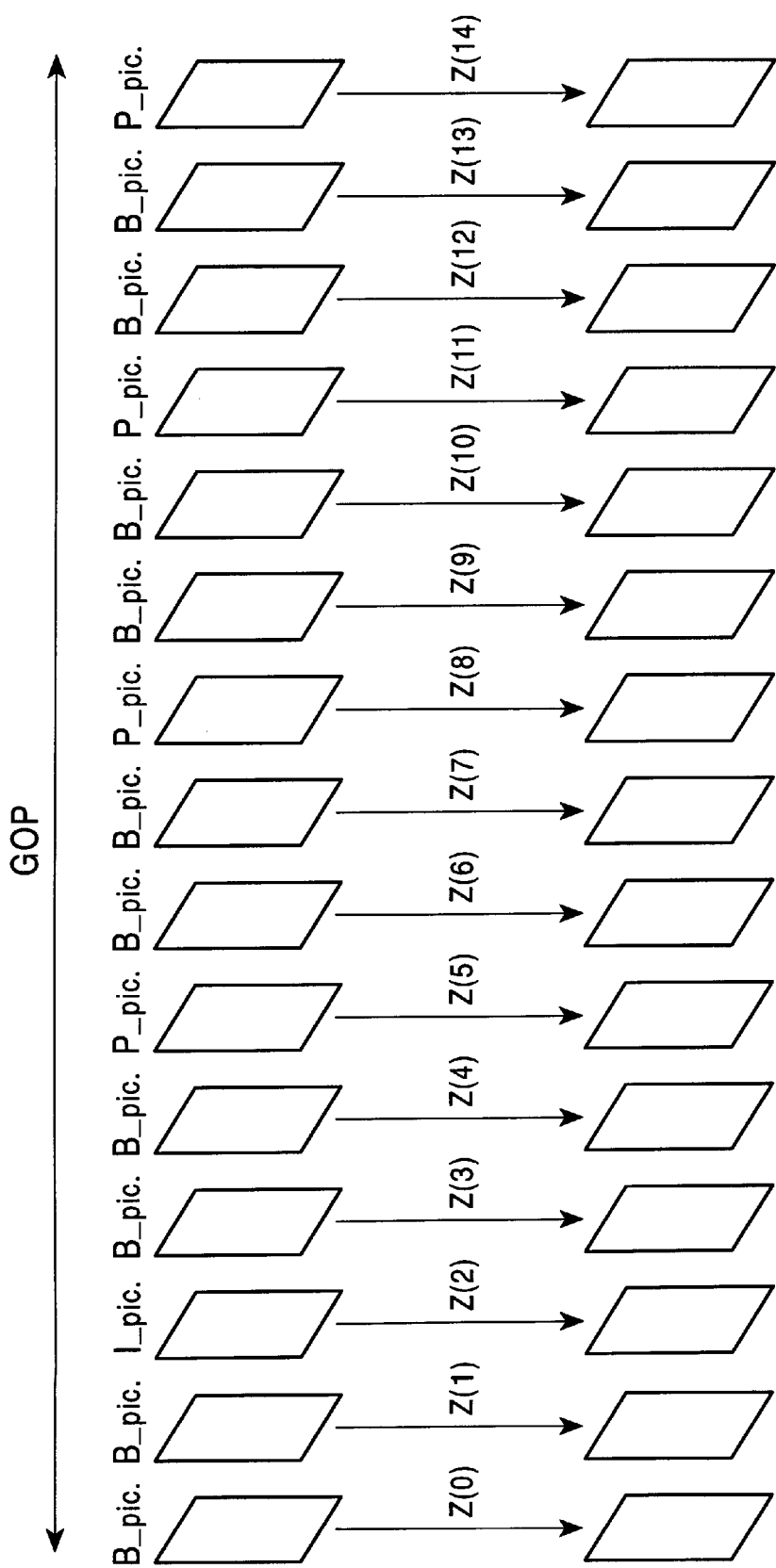
FIG. 2 shows an example of a GOP in the MPEG standard.

FIG. 2 shows an example of this phase angle z in GOP.

The following examples are possible about how this phase angle is changed within the GOP.

First Example

Assuming that the color-difference signals of all the frames contained in GOP (Closed GOP) are vectors on the Cr/Cb plane, the color-difference signal of each picture is rotated uniformly in accordance with an initially set phase angle z (rotational angle).

For example, if phase angle=0.5 is set, a change sequence of the phase angle is 0.5/0.5/0.5/0.5/0.5/0.5/0.5/0.5/0.5/0.5/0.5/0.5/0.5/0.5/0. 5 - - - .

Therefore, if the phase angle 0.5 is represented by code 1, this phase angle change can be represented as 1111 1111 1111 1111 - - - . This becomes a key signal.

In the first example, scrambling is performed by forming an image such that the colors are changed for each Closed GOP. Among the Closed GOP, since a prediction process is not performed, in a first scramble, encoding efficiency does not decrease in comparison with that in a case in which scrambling is not performed. Further, in this example, decoding can be performed even if a key signal is not transmitted by setting a desired phase angle by the transmission side and the receiving side.

Meanwhile, since changes in the phase angle are monotonous, there is a possibility that scrambling might be deciphered easily by a third party.

Second Example

In the display sequence of a group of pictures (GOP), the color-difference signal of the beginning frame is assumed to be a vector on the Cr/Cb plane and is rotated in accordance with an initialized phase angle z (rotational angle), and further, the phase angle is increased or decreased randomly for each frame starting from the next frame.

That is, the t-th phase angle can be represented as $z(t)=z(t-1)+$(amount of increase or decrease).

Here, the initial phase angle is set at +1.0, the amount of increase or decrease is set at 0.0, +/−0.5, +/−1.0, +/−1.5, and the sequence of the phase angle change is set at +1.0/+0.0/+1.5/+1.0/−0.5/−0.5/+0.5/+1.0/−1.0/+0.5/1.5/+0.5/+1.0/+0.5/−0.5 - - - .

The types of this phase angle (+/−0.5, +/−1.0, +/1.5) can be represented by 3 bits. Therefore, if 0.0 is represented as 000, +0.5 as 001, −0.5 as 101, +1.0 as 010, −1.0 as 110, +1.5 as 011, and −1.5 as 111, a key signal of the second example can be represented as 010 000 011 010 101 101 001 010 110 001 111 001 010 001 101 - - - .

In this second example, colors change at a speed in proportion to the amount of increase or decrease for each frame. This achieves scrambling.

However, since the greater the change (amount of increase or decrease) of the phase angle, the more the prediction efficiency is decreased, the balance between scrambling effect and prediction efficiency must be considered.

Third Example

Figure 3:
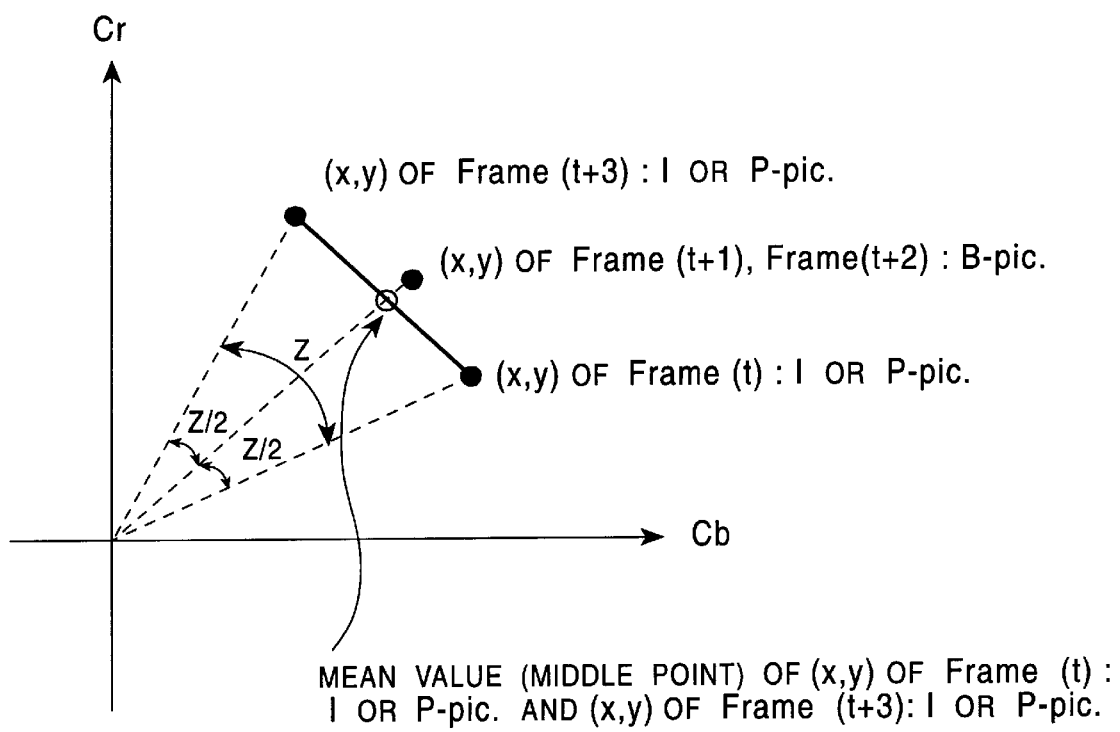
FIG. 3 shows a third example of scrambling according to the present invention.

As in the second example, the phase angle is increased or decreased randomly for each frame, but the amount of the increase or decrease is adjusted in accordance with the picture type of each frame. For example, as shown in FIG. 3, in the B picture, the phase angle is set so as to become an intermediate value of the phase angles (rotational angles) of the I or P picture on both sides surrounding the B picture. In respect of this, a bidirectionally-predictive mode is often used when the B picture is encoded, and in this mode, a mean value of the pixels of the I/P pictures on both sides, which are reference images, becomes a predictive angle. Therefore, setting the phase angle at an intermediate value makes it possible to bring the predictive value close to the intermediate value of the phase angles in an approximate manner.

This setting improves the prediction efficiency of the B picture.

Fourth Example

Although the encoding efficiency of the I picture is not affected as a result of rotating a color-difference signal (Cr, Cb), the encoding efficiency is decreased in the P and B pictures for performing prediction. In other words, the greater the number of predictions performed, the more the encoding efficiency is decreased due to scrambling. For this reason, in order to minimize a decrease in efficiency over the entire GOP, the amount of change of the phase angle (rotational angle) is adjusted.

For example, the following examples are possible when the GOP of FIG. 2 is taken as an example.

(i) When the phase is increased uniformly

If it is assumed that there are two types (0.0/0.5) of phase angle, these types can be represented by 1 bit. That is, even if the phase angle is changed for each picture, it is possible to manage with a 1-bit overhead.

Figure 4:
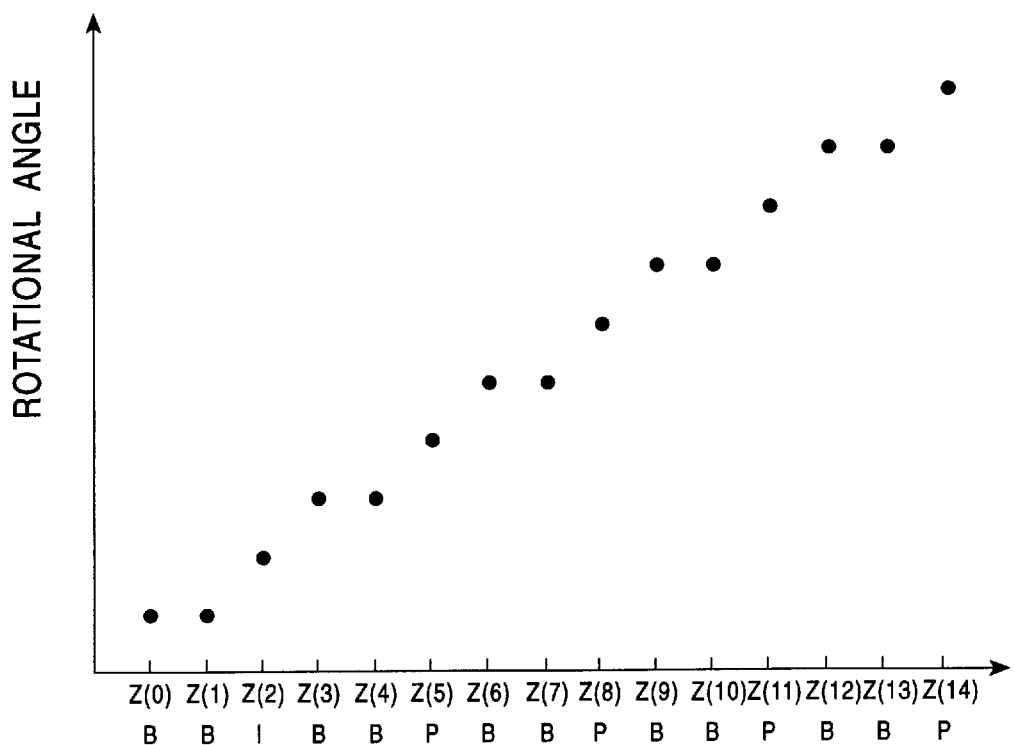
FIG. 4 shows a fourth example (No.1) of scrambling according to the present invention.

For example, a phase angle z=0.5 is given to the picture encoded in the first B picture, and an angle is given as 0.0/0.5/0.5/0.0/0.5/0.5/0.0/0.5/0.5/0.0/0.5/0.5/0.0/0.5/ - - - starting from the next picture. Here, the change in the phase angle indicates a relative phase difference with respect to the immediately preceding picture. The relationship between the change in the phase angle and the pictures at this time is shown in FIG. 4.

Therefore, if 0.0 is set to 0 and 0.5 to 1, this angle change can be represented as 1011 0110 1101 101-, and this becomes a key signal. For example, the 8 bits of the first half can be represented as 1 byte.

(ii) When the amount of change is adjusted according to the distance from the I picture When the distance from the I picture is small, the amount of increase/decrease is increased, and the amount of increase/decrease is relatively decreased with an increase in the number of predictions performed. Here, four types of the phase angle are generated (0.0/0.5/1.0/1.5). These types can be represented by 2 bits, and even if the phase angle is changed for each picture, it is possible to manage with a 2-bit overhead.

Also in this case, similar to the first example, the phase angle z is sequentially changed randomly.

Figure 5:
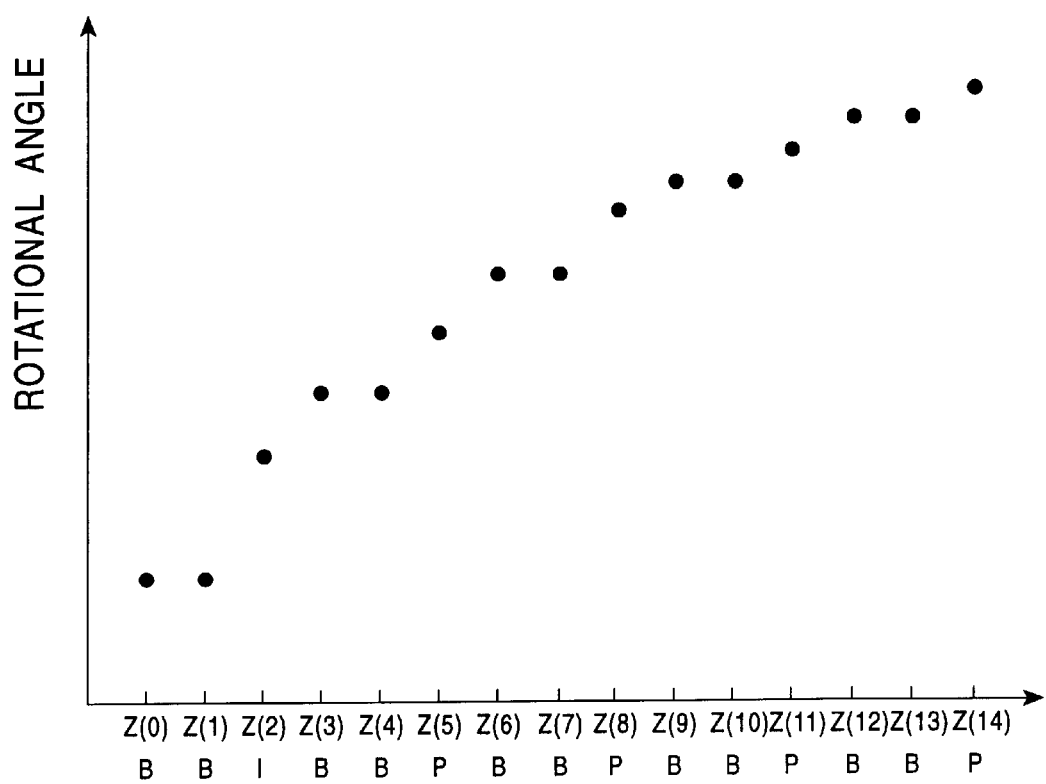
FIG. 5 shows a fourth example (No.2) of scrambling according to the present invention.

An angle is given as 1.5/0.0/1.5/1.0/0.0/1.0/1.0/0.0/1.0/ 0.5/0.0/0.5/0.5/0.0/0.5/ - - - . Therefore, if 0.0 is set to 00, 0.5 to 01, 1.0 to 10, and 1.5 to 11, this angle change can be represented as 1100 1110 0010 1000 1001 0001 0100 01 - - - , and this becomes a key signal. The relationship between the change of the phase angle and the pictures at this time is shown in FIG. 5. As is clear from this figure, the phase angle is increased in the first I picture of the GOP, and the phase angle is decreased the further away from this I picture the picture becomes. As a result, the encoding efficiency of the P/B picture is improved more than in a case in which the phase angle is set simply randomly.

Although the above-described examples describe an increase or decrease of the phase angle in one direction, any combination of increase and/or decrease may be possible.

Figure 6:
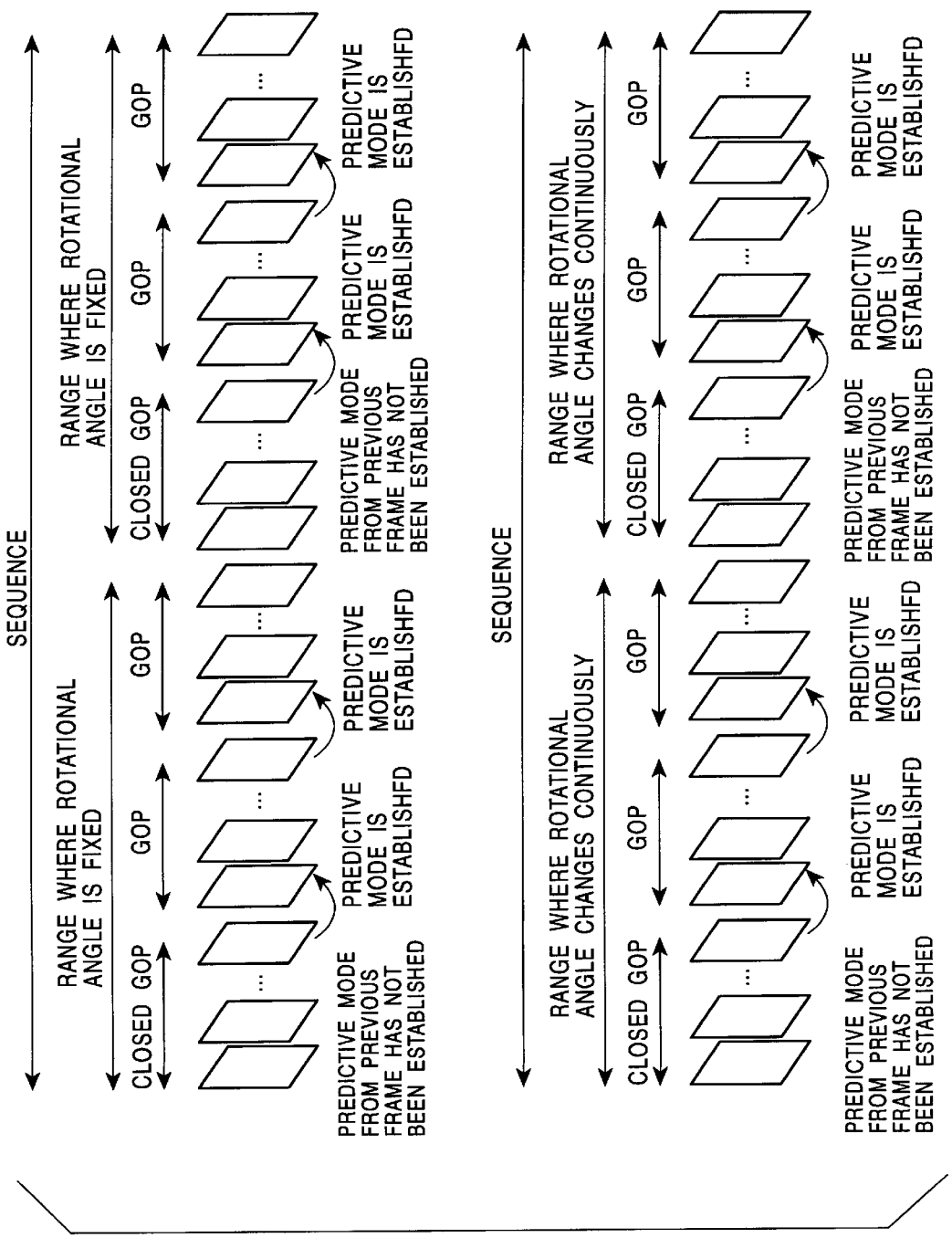
FIG. 6 shows an example in which a Closed GOP is contained in an image sequence.

Further, when the sequence of images is as shown in FIG. 6, in the Closed GOP such that there is no prediction from the frames of the previous GOP, changes of the phase angle may be reset temporarily. In this case, a flag for the Closed GOP is necessary when a key signal is generated.

Next, a circuitry for realizing the present invention will be described.

Figure 7:
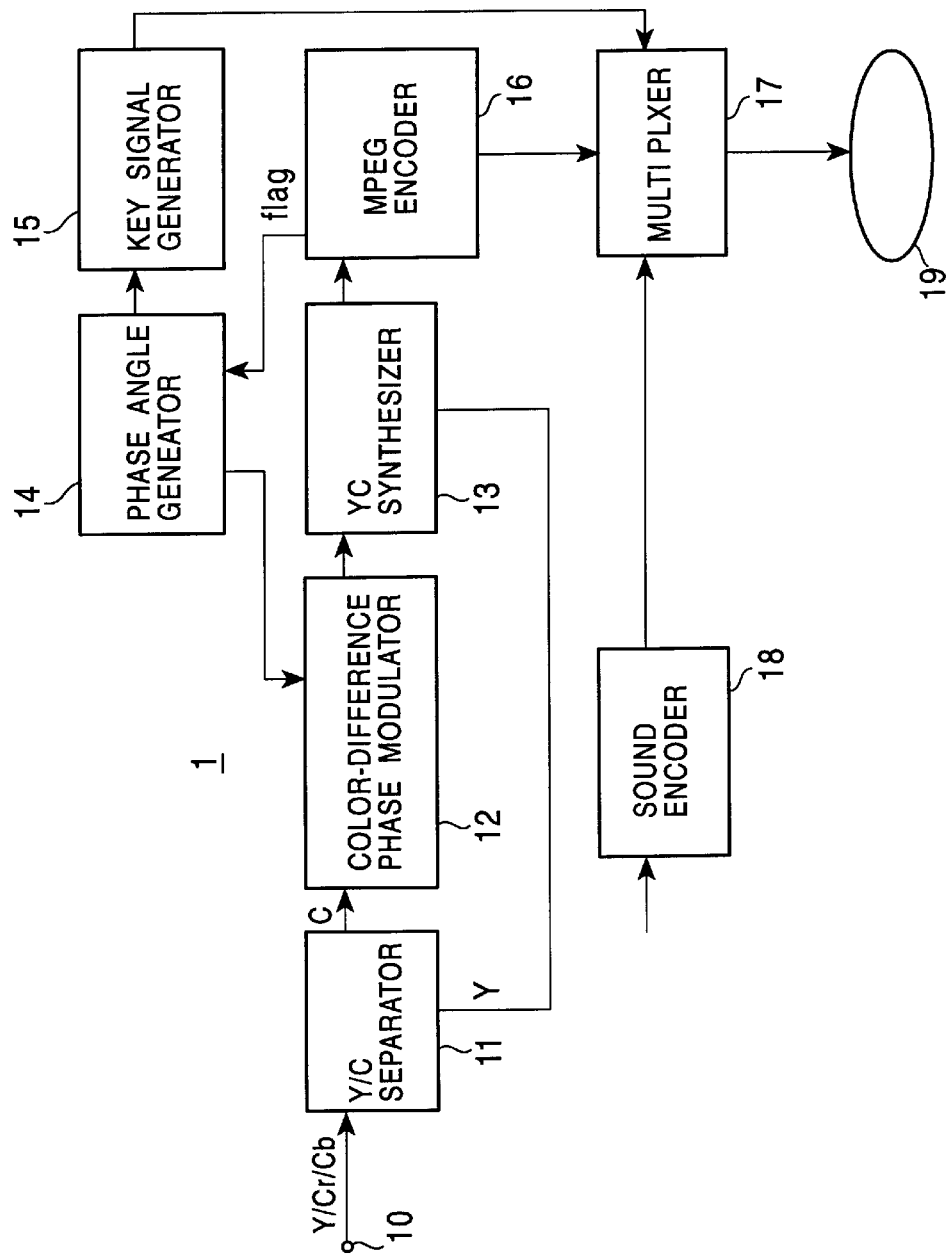
FIG. 7 shows an example of the construction of an encoder according to the present invention.

FIG. 7 is a block diagram of a coder 1, and also illustrates a basic operation of an image encoding method in accordance with the present invention. This image encoding method is applied to perform image encoding on input image signals by an MPEG method.

In FIG. 7, image signals in a form that a luminance signal Y and color-difference signals Cb and Cr are mixed are input from a terminal 10. The luminance signal and the color-difference signals of the input image are separated by a Y/C separator 11.

Meanwhile, in a phase angle generator 14, a phase angle z is generated for each of, for example, 15 pictures which form a GOP on the basis of a GOP flag input from an MPEG encoder 16, and the above-described changes in the phase angle within the 1 GOP are supplied to a key generator. Since the structure of the pictures of the GOP is predetermined in the MPEG, in this example, the phase angle z is generated on the basis of the GOP flag; however, the phase angle z may be generated on the basis of a picture flag.

In a key generator 15, changes of the phase angle obtained by the phase angle generator 14 are represented by the code sequence described above, and a key signal is generated. The generated key signal is supplied to a multiplexer 17 to be described later.

In a color-difference phase modulator, the color-difference signals Cb and Cr are phase-modulated on the basis of the change information of the phase angle obtained by the above-described phase angle generator. These phase-modulated color-difference signals and the luminance signal obtained by the Y/C separator 11 are synthesized by a Y/C synthesizer 13 and supplied to the MPEG encoder 16. The synthesis of the luminance signal and the color-difference signals in the Y/C synthesizer 13 is performed by taking into consideration a delay in the color-difference phase modulator (not shown).

In the MPEG encoder 16, the supplied image signals are predictive-encoded using movement compensation, and encoded image signals and various control information are supplied to the multiplexer 17.

In the multiplexer 17, a sound encoded signal encoded by a predetermined method in a sound encoder 18 and encoded image signals and control information from the MPEG encoder 16 are multiplexed in a predetermined format, a key signal for 1 GOP supplied from the key generator is added to, for example, the GOP header, and thus an encoded bit stream is generated. A key signal for one sequence may be added to the sequence header, or a key signal for one picture may be added to the picture header of each picture.

An error correction encoding process or the like is performed (not shown) on the generated encoded bit stream, and this bit stream is recorded on a disk 19 and/or transmitted to a transmission line (not shown).

Next, a description will be given of a decoder for decoding data recorded on the disk 19 (or, transmitted from a transmission line (not shown)).

Figure 8:
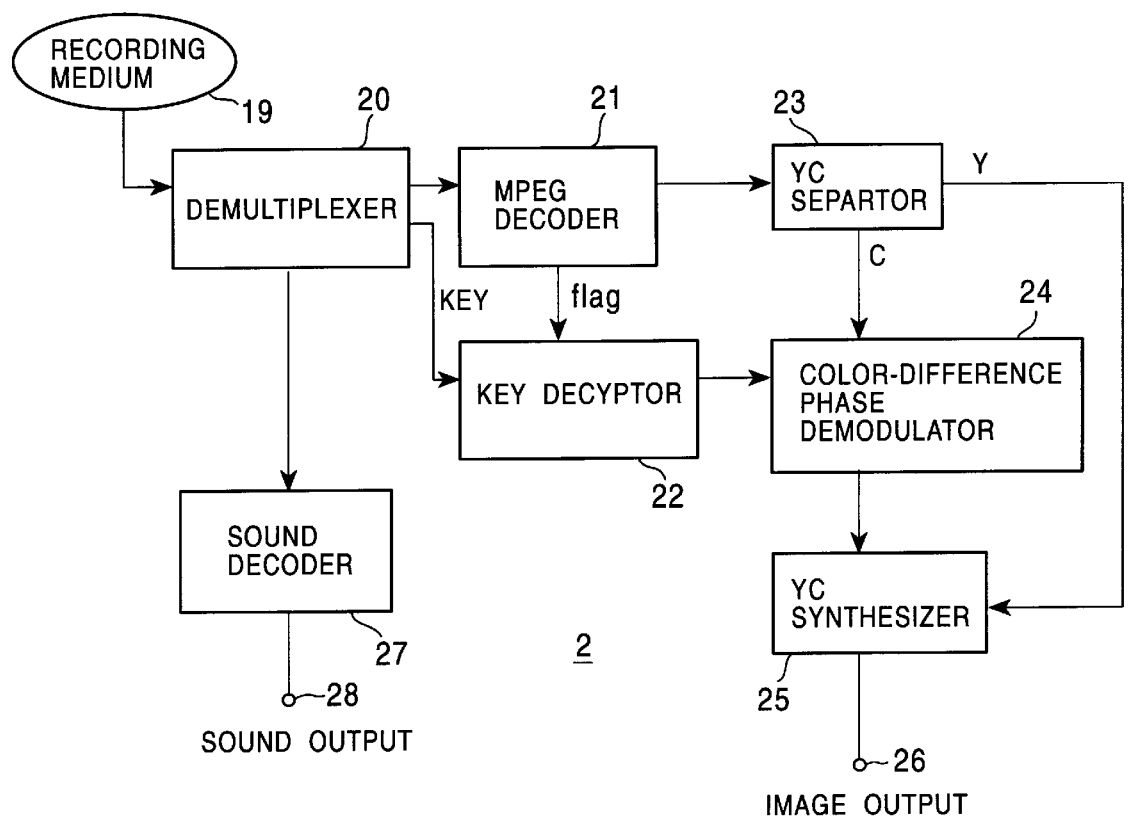
FIG. 8 shows an example of the construction of a decoder according to the present invention.
Figure 9A:
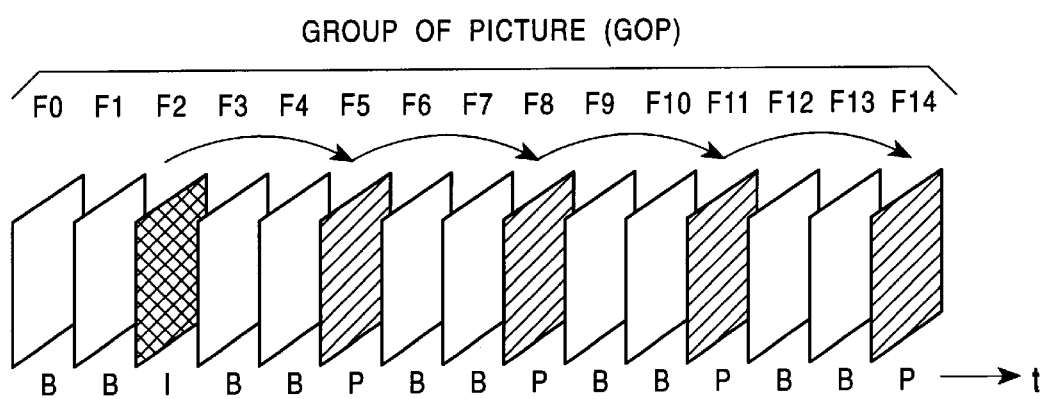
FIGS. 9A and 9B show a reference relationship between I pictures and P pictures, and a reference relationship between B pictures and I/P pictures.
Figure 9B:
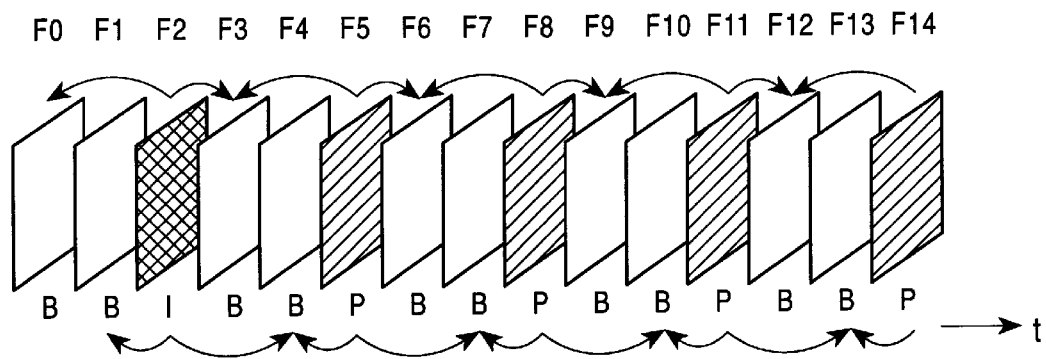
Figure 10:
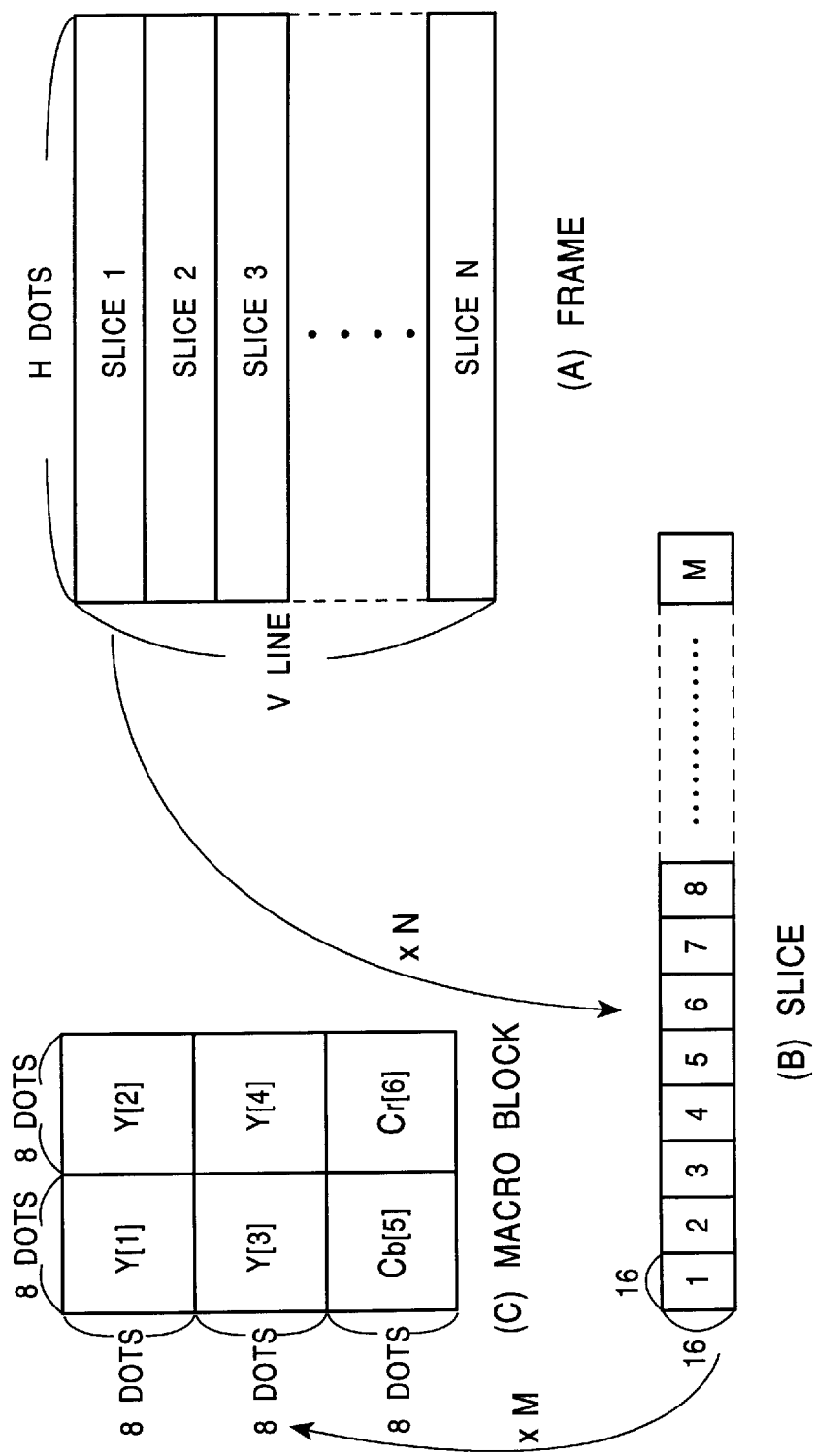
FIG. 10 shows a layer structure of each picture.

FIG. 8 is a block diagram illustrating the construction of a decoder 2, and also illustrates an operation for decoding image signals encoded by an encoding method in accordance with the present invention.

An error correction process or the like is performed (not shown) on data obtained from the disk 19, and this data is supplied to a demultiplexer 20.

In the demultiplexer 20, the encoded bit stream is separated into encoded image signals containing control information and sound encoded signals, and further into a key signal. The encoded image signals are supplied to an MPEG decoder 21, the key signal is supplied to a key decryption unit 22, and the sound encoded signals are supplied to a sound decoder 27. In this example, the key signals are taken, for example, from the GOP header of the encoded image signals.

The key signal is decrypted by the key decryption unit 22, and the sequence of the phase angle change such as that described above can be obtained in correspondence with the GOP and flags of a picture type and the like from the MPEG decoder 21. This sequence of the phase angle change is supplied to a color-difference phase demodulator 24.

In the MPEG decoder 21, the encoded image signals are predictive-decoded using movement compensation, and the decoded image signals are applied to a Y/C separator 23. Since the color-difference signals Cr and Cb of these decoded image signals are kept as they are phase-modulated, it is not possible to reproduce the signals normally as they are.

In the Y/C separator 23, the decoded image signals are separated into the luminance signal Y and the color-difference signals Cr and Cb. The luminance signal Y is supplied to a Y/C synthesizer 25, and the color-difference signal is supplied to the color-difference phase demodulator 24.

In the color-difference phase demodulator 24, the phase of a color-difference signal of a picture corresponding to the change sequence is returned to a phase before being phase-modulated by the coder 1 on the basis of the sequence of the phase angle change supplied from the key decoder.

In the Y/C synthesizer 25, the luminance signal Y delayed by an amount for demodulating the color-difference phase by a delay unit (not shown) and the phase-demodulated color-difference signals are synthesized, and output as a reproduction image from an output terminal 26.

In the sound decoder 27, a predetermined decoding process is performed on the sound encoded signals, and the signals are output as a reproduction sound from an output terminal 28.

On the other hand, when there is no key signal, that is, when there is no decoding permission in the decoder, the color-difference signals of the reproduction image cause a color error. Therefore, since, moreover, colors change moment by moment for each picture with the GOP functioning as a unit, an extremely poor reproduction image is formed.

According to the present invention, when a digital image signal formed of a luminance signal and color-difference signals is formed into an encoded signal by an MPEG encoding method, this signal is scrambled by giving a predetermined phase angle to the color-difference signal, the scrambled image signal is MPEG-encoded, a signal for identifying a phase angle is generated, and at least the above-described MPEG-encoded image signal and the signal for identifying a phase angle are multiplexed and output. Therefore, it is possible to provide an encoding method in which a scrambling process is easy, and further, in which all frames can be scrambled, and still furthermore, scrambling can be performed such that the MPEG standard is used as it is.

Further, according to the present invention, in a recording medium on which image signals formed of a luminance signal and color-difference signals are recorded, the image signal is scrambled by giving a predetermined phase angle to the color-difference signals, and this scrambled image signal is MPEG-encoded, a signal for identifying the phase angle is generated, and at least the MPEG-encoded image signal and the signal for identifying the phase angle are multiplexed and generated. Therefore, it is possible to provide a recording medium on which image signals are recorded which are scrambled using the MPEG standard as it is.

Furthermore, according to the present invention, in an image decoding method for forming a moving image from an MPEG-encoded image signal which is formed of a luminance signal and color-difference signals, and which is at least scrambled by giving a predetermined phase angle to the color-difference signals, the scrambled MPEG-encoded signal is separated to generate an MPEG-encoded image signal and a signal for identifying the predetermined phase angle supplied to the color-difference signals, the MPEG-encoded image signal is decoded, the decoded image signal is unscrambled from the signal identifying the predetermined phase angle, and an at least unscrambled image signal is output. Therefore, it is possible to decode an image signal encoded by the present invention.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image encoding method for forming a digital image signal formed of a luminance signal and color-difference signals into an coded signal by an MPEG encoding method, said image encoding method comprising the steps of:

separating said luminance signal and said color difference signals from said digital image signal;

performing scrambling by giving a predetermined phase angle only to said color-difference signals and not to said luminance signal;

MPEG-encoding the scrambled image signals;

generating a signal for identifying said phase angle; and multiplexing said image signals which are at least MPEG-encoded and the signal for identifying said phase angle and outputting the multiplexed signals, wherein said predetermined phase angle is sequentially changed randomly by at least one of GOP unit and picture unit of said MPEG-encoding.

2. A recording medium on which an image signal formed of a luminance signal and color-difference signals is recorded, said image signal being formed by the following steps:

performing scrambling by giving a predetermined phase angle only to said color-difference signals and not to said luminance signal;

MPEG-encoding the scrambled image signals;

generating a signal for identifying said phase angle; and multiplexing said image signals which are at least MPEG-encoded and the signal for identifying said phase angle and outputting the multiplexed signals, wherein said predetermined phase angle is sequentially changed randomly by at least one of GOP unit and picture unit of said MPEG-encoding.

3. An image decoding method for forming a moving image from MPEG-encoded image signals which are formed of a luminance signal and color-difference signals and which are at least scrambled by giving a predetermined phase angle only to the color-difference signals and not to the luminance signal, the image decoding method comprising the steps of:

separating scrambled MPEG-encoded signals in order to generate MPEG-encoded image signals and a signal for identifying the predetermined phase angle given to said color-difference signals;

decoding said MPEG-encoded image signals;

unscrambling said decoded color difference signals using the signal for identifying said predetermined phase angle; and outputting said image signals formed of said at least unscrambled color difference signals and said luminance signal, wherein said predetermined phase angle is sequentially changed randomly by at least one of GOP unit and picture unit of said MPEG-encoding.

* * * * *